Feb. 6, 1962 E. S. WIESZECK 3,019,652
DEVELOPMENT TIME METER
Filed Jan. 2, 1958

Inventor,
Emil S. Wieszeck,
by M. H. Hamilton
Attys.

United States Patent Office 3,019,652
Patented Feb. 6, 1962

3,019,652
DEVELOPMENT TIME METER
Emil S. Wieszeck, P.O. Box 389, Salem, N.H.
Filed Jan. 2, 1958, Ser. No. 706,862
3 Claims. (Cl. 73—363.7)

This invention relates to a method and apparatus for controlling photographic exposures and more particularly the invention is concerned with regulating and rendering more precise photographic development periods normally resorted to in cameras, for example, of the class in which a photosensitive sheet and a processing liquid carrier sheet are combined to undergo exposure and development.

In applying a processing liquid to an exposed area of a photosensitive sheet, as taught by the patent to Land No. 2,576,022, it is customary to force a processing liquid out of container pods on to the exposed surface and then to hold the processing liquid on the surface of the exposed photosensitive sheet for a short interval to obtain a desired photographic development. It has been found that the duration of the exposure and development time required for satisfactory images varies directly with changes in ambient temperature and, as a result in many instances, successful use of such a photosensitive sheet may depend on knowing in advance precisely what exposure and development time interval should be employed at a specific temperature condition.

It is an object of the present invention to deal with the problem indicated and to provide means for controlling in a more satisfactory manner photographic exposure and development operations of the class indicated. It is also an object of the invention to devise a novel developing time indicator mechanism which is provided with heat insulating features and which may be conveniently combined with a camera of the type described in the above noted Land patent, either separately or in conjunction with other measuring devices.

These and other objects and novel features will be more fully understood and appreciated from the following description of a preferred embodiment of the invention selected for purposes of illustration and shown in the accompanying drawings, in which FIG. 1 is a fragmentary elevational view of a portion of a Polaroid type camera as viewed from the rear, illustrating a preferred embodiment of the invention mounted thereon;

Figure 1:
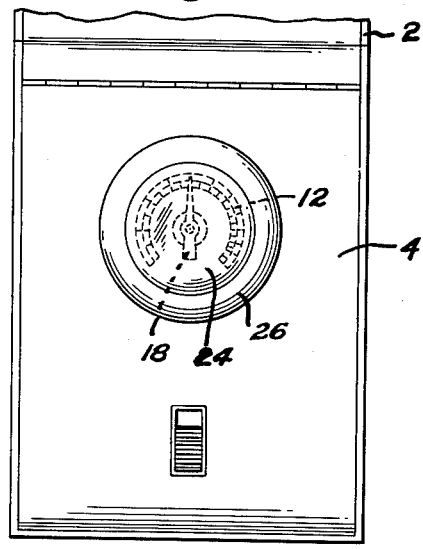
Figure 2:
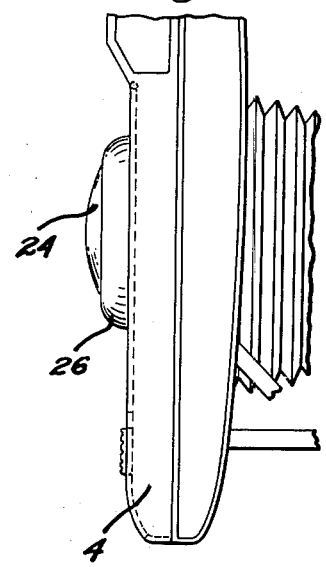
FIG. 2 is a side elevational view of the apparatus shown in FIG. 1.
Figure 3:
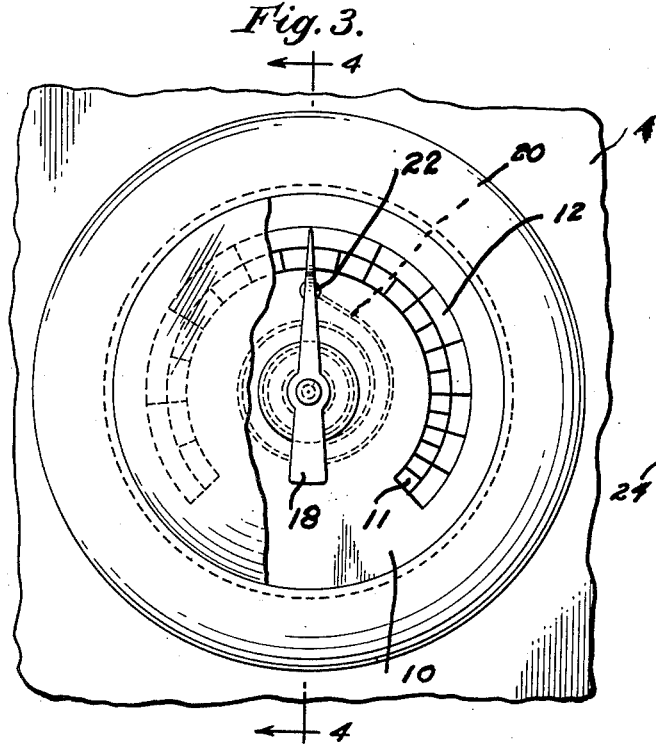
FIG. 3 is an enlarged elevational view of the structure of the invention and further illustrating details of construction of a temperature sensing means.

I have observed that in developing latent images from an exposed film of the type for example used in a camera such as described in the above noted Land patent, small but highly important changes in the ambient temperature in the immediate vicinity of a film to be exposed and developed may have a very considerable bearing on the correct time interval to be used in carrying out development of a satisfactory image. The present invention, therefore, is based upon the novel concept of providing a method and means for preventing temperature fluctuation near the film and for determining at a substantially constant temperature condition the most nearly correct processing or development interval to be employed. This is accomplished by inserting a temperature sensing device through a wall of the camera. In thus breaking through the wall of the camera to provide an aperture for supporting the indicator, it will be appreciated that it is essential to provide means for positively excluding light rays or thermal effects. For this purpose I may provide special heat insulating and light excluding means.

In this connection I have discovered that a very practical embodiment of this concept may be realized by the use of a temperature sensing means thermally shielded and suported in a manner such that it may be conveniently brought into close proximity to the body or bodies closely surrounding the film which has been exposed and is to be developed.

In one specific aspect, therefore, the invention involves determining, by means of a thermally shielded sensing device, the ambient temperature level in the immediate vicinity of a film, and then controlling the exposure and the time interval during which the latent image is exposed to treatment by the developer or similar chemical agent in accordance with the temperature observed.

Considering more in detail the preferred embodiment of the apparatus illustrated in the drawings, numeral 2 denotes a camera body of the so-called "Polaroid" type described and claimed in the above noted Land Patent No. 2,576,022. As disclosed in this patent the camera body 2 is provided with a hinged door 4, and adjustably secured on the inner surface of the door is a plate member 6 which is utilized in the application of processing liquid to the surface of an exposed film supported within the camera body. Further details of the camera construction and method of operation may be had from a reading of the specification of the said Land patent.

In accordance with the invention I provide an indicator device which I may conveniently refer to as a "development time meter" or exposure factor indicator and which is adapted to be secured to the camera 2 at one of several desired points. For example, by making the back of the indicator device flat, this member may be adhesively secured to the camera or attaching screws may be used. A further specific arrangement which is regarded as preferable, and which has been illustrated in more detail in the drawings, consists of a casing body 8 of generally cylindrical construction which is designed to be mounted through the door 4 in an opening formed in this member for receiving the casing body, as suggested in the drawings and particularly illustrated in FIG. 4. The casing body may be constructed with a rib 8a which permits the casing to be snapped into place in the door opening.

Supported in the casing 8 in some convenient manner is a heat resistant dial 10 which is provided with a graduated scale 12 representing predetermined developing time intervals or exposure factor values which have been calibrated against a series of specific temperature values. The dial is designed to resist flow of heat and is formed for example of a paper coated with a heat insulating reflective plastic such as a phenolic resin. Located centrally through the dial 10 is a fixed bearing member 14 in which is rotatably supported a spindle 16 having fixed at the outer end thereof a pointer 18 adapted to be moved into various positions of register with respect to the graduated scale 12.

The dial 10 bearing 14 and spindle 16 are constructed to comprise a novel heat resistant unit which prevents fluctuation in the ambient temperature within the casing 2. Thus the bearing 14 is formed of a plastic such as nylon which is of low heat conductivity; the spindle 16 is composed preferably of a plastic such as a phenolic resin. The resin may also be coated with a metallic film such as a chromium coating to provide a bearing surface. This arrangement is found to insure thermal shielding of an essential character in connection with establishing a precise development interval.

At the opposite end of the spindle 16 there is secured a bimetallic temperature sensing element 20 which is coiled about itself and which has its other extremity anchored to a post 22, in turn supported in the dial 10.

Figure 4:
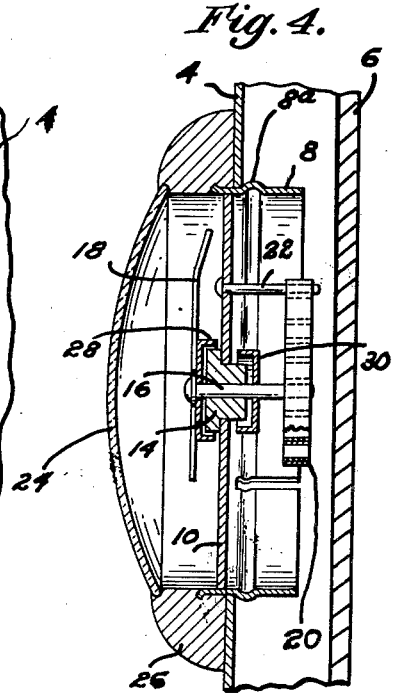
FIG. 4 is a cross-section taken on the line 4—4 of FIG. 3.

The casing may, if desired, be covered by a tinted translucent cover element 24 adjustably secured in place by means of a retaining ring 26. The tinting of the translucent cover element 24 can reduce heat transmission to the interior of the meter by 35%. In thus breaking through the door of the camera to provide an aperture for supporting the indicator, it will be appreciated that it may be desired to provide means for positively excluding any light rays from entering the camera interior, and also trap air providing heat insulation as well as reflection. For this purpose I may provide a light trap and heat reflector 28 which consists of a flanged cover of high light reflective and low heat conductive characteristics mounted around the pointer 18 and overlying a substantial part of the bearing member 14, as shown in FIG. 4. Likewise, I may provide a second light trap and heat reflector 30 consisting of another flanged cover of low heat conductivety material, also carried by the pointer 18, and overlying the inner reduced end of the bearing member 14, as noted in FIG. 4.

The arrangement described is intended to be illustrative generally of a means for supporting the bimetallic member 20 in close proximity to the pressure plate 6 so that there can be measured and observed in a highly accurate manner the true temperature level at points immediately surrounding the pressure plate 6. It is pointed out that by projecting the bimetallic body through the camera door, and preventing heat from passing through the scale components, it is possible to avoid temperature differences which may exist between the pressure plate where the actual developing action takes place and outer exposed surfaces of the camera which, in many conditions of use, may have a quite different temperature value, depending upon the external conditions where the camera is in use.

It will be fully appreciated, therefore, that the invention is not, in any way, intended to be limited to the specific mounting details for locating the bimetallic sensing element in close proximity to the plate 6. Similarly, it should be understood that I may desire to employ in place of the bimetallic coil other types of temperature sensing devices, such as glass thermometers, Bourdon tubes, and the like.

The dial 10 may also carry one or more scales, such as the scale 11, for example. Assuming the scale 12 earlier described is suitable for a photosensitive sheet having a film speed, for example, of 64 ASA and it is desired to deal with other films of different ratings, additional scales may be calibrated and added to the dial. The user will then read the correct scale for a given film, employing the same pointer and metering device.

Another desirable feature which I may employ is the combination with the temperature sensing element of a chromometer, such as a stop watch. The stop watch may be employed to provide the correct timing once the necessary time interval has been determined.

Still another arrangement which I may desire to resort to in utilizing the development time meter may comprise the combination of the development time meter in a photoelectric light exposure meter of the type used to determine camera iris aperture and shutter speed. This particular arrangement is not necessarily limited to photoelectric types but may be used with extinction and other similar types of devices. The important feature in such a combination is the provision of means in one unit for reading camera shutter speeds; correct lens opening to admit light; and development time or exposure factor. It is also pointed out that a development time meter of this general construction may be employed to measure the temperature of a developing solution and used in various connections therewith.

The operation of the development time meter of the invention is thought to be obvious from the above description. Upon an exposure of a roll or sheet of photosensitive material in the camera the development time meter is inspected and the necessary development time noted for the particular ambient temperature condition which may be in effect within the camera. The pods of processing liquid are then released and the processing liquid is allowed to remain in contact with the film for the noted time interval. Thereafter the film is handled in the usual manner.

While I have shown a preferred embodiment of the invention, it will be understood that various other changes and modifications may be resorted to in keeping with the spirit of the invention as defined by the scope of the appended claims.

This application is a continuation-in-part of my application, Serial No. 381,419, filed September 21, 1953, now abandoned.

Having thus described my invention, what I desire to claim as new is:

1. In an installation in which the temperature of a medium on one side of a barrier is to be indicated to an observer on the other side thereof, said barrier having an aperture therethrough, an indicator device comprising temperature sensing means on said one side of said barrier and in registry with said aperture, means including a dial plate substantially closing said aperture, said dial plate having a dial scale thereon on the side opposite said temperature sensing means and being made of heat insulating material, a spindle connected to and movable by said temperature sensing means, said spindle extending through said aperture closing means and being made of heat insulating material, and a pointer on said spindle on the side of said dial plate opposite said temperature sensing means.

2. The combination of claim 1, said dial plate having an aperture therethrough, a bearing of heat insulating material substantially filling said dial plate aperture, said spindle passing through said bearing.

3. The combination of claim 2, and heat shielding means on said spindle on either side of said bearing.

References Cited in the file of this patent

UNITED STATES PATENTS

| | | |
|---|---|---|
| 798,211 | Putnam | Aug. 29, 1905 |
| 1,004,947 | Watkins | Oct. 3, 1911 |
| 1,302,777 | Downing | May 6, 1919 |
| 1,728,361 | Pifer | Aug. 25, 1927 |
| 2,137,094 | Nodine | Nov. 15, 1938 |
| 2,268,006 | Andresen | Dec. 30, 1941 |
| 2,446,668 | Tuttle | Aug. 10, 1948 |
| 2,455,111 | Carbone | Nov. 30, 1948 |
| 2,755,666 | Muncheryan | Apr. 23, 1953 |
| 2,794,377 | Fairbank | June 4, 1957 |

FOREIGN PATENTS

| | | |
|---|---|---|
| 233,872 | Switzerland | Aug. 31, 1944 |